United States Patent [19]

Hieda

[11] Patent Number: 4,860,092
[45] Date of Patent: Aug. 22, 1989

[54] COLOR IMAGE SIGNAL PROCESSING CIRCUIT WITH WHITE BALANCE CONTROL AND GAIN CONTROL

[75] Inventor: Teruo Hieda, Yokohama, Japan

[73] Assignee: Canon Kabushiki Kaisha, Tokyo, Japan

[21] Appl. No.: 922,293

[22] Filed: Oct. 23, 1986

[30] Foreign Application Priority Data

Nov. 9, 1985 [JP] Japan ................. 60-251490

[51] Int. Cl.⁴ ............ H04N 9/73; H04N 9/04; H04N 9/07; H04N 9/09
[52] U.S. Cl. .................. 358/29; 358/41; 358/44; 358/50
[58] Field of Search ........ 358/29, 29 C, 41, 43, 358/44, 48, 50

[56] References Cited

U.S. PATENT DOCUMENTS

| Re. 28,774 | 4/1976 | Kubota et al. | 358/29 |
|---|---|---|---|
| 4,513,313 | 4/1985 | Kinoshita et al. | 358/44 |
| 4,616,253 | 10/1986 | Hashimoto et al. | 358/29 C |
| 4,638,352 | 1/1987 | Noda et al. | 358/29 C |
| 4,750,032 | 6/1988 | Nakayama | 358/29 C |
| 4,751,567 | 6/1988 | Hashimoto | 358/29 C |

FOREIGN PATENT DOCUMENTS

| 53-139428 | 12/1978 | Japan | 358/50 |
|---|---|---|---|
| 56-48790 | 5/1981 | Japan | 358/29 C |
| 59-97291 | 6/1984 | Japan | 358/44 |
| 60-66588 | 4/1985 | Japan | 358/29 C |

OTHER PUBLICATIONS

Nabeyama, Hiroaki, et al., "All Solid State Color Camera with Single-Chip MOS Sensor", *IEEE Transactions on Consumer Electronics*, vol. CE-27, Feb. 1981, pp. 40-46.

Primary Examiner—Howard W. Britton
Assistant Examiner—Randall S. Svihla
Attorney, Agent, or Firm—Fitzpatrick, Cella, Harper & Scinto

[57] ABSTRACT

A color image pickup apparatus in which a luminance signal is formed by repeatedly switching, one by one, red, green and blue color signals separated by color separation circuits from a dot sequential output of a color CCD image pickup element and balanced by a white balance control circuit. The red, green and blue color signals are combined in a luminance signal processing circuit. The apparatus further comprises a first gain control circuit for increasing the gain of the luminance signal processing circuit in order to increase the sensitivity of the apparatus. Also a second gain control circuit is provided for decreasing the signal level of the blue color signal supplied to the luminance signal processing circuit when the gain of the luminance signal processing circuit is increased. Circuitry may be included for processing the color temperature and the brightness of the object so as to control the balance of the plural different color signals. Thus, it is possible to prevent the S/N of the luminance signal from lowering when the luminance signal processing circuit is operating in a condition of high gain.

32 Claims, 4 Drawing Sheets

COLOR IMAGE SIGNAL PROCESSING CIRCUIT WITH WHITE BALANCE CONTROL AND GAIN CONTROL

BACKGROUND OF THE INVENTION

1. Field of the Invention

The present invention relates to image pickup apparatus and, more particularly, to color image pickup apparatus having white balance control means and gain or sensitivity control means.

2. Description of the Related Art

It has been proposed in color image pickup to form a luminance signal Y by sequentially switching and combining color signals, for example, R(Red), G(Green) and B(Blue) signals obtained by means of a color filter arrangement provided in front of an image pickup means, and to form color difference signals R-Y and B-Y through a matrix circuit after the color signals R, G and B have been processed by respective processing circuits. Thereafter, a standard television signal is composed from the luminance signal Y and the color difference signals R-Y and B-Y at an encoder circuit. This technique is disclosed in, for example, U.S. application Ser. No. 925,459, filed Oct. 30, 1986, now U.S. Pat. No. 4,751,567, which is a continuation of U.S. application Ser. No. 554,369, filed Nov. 22, 1983, now abandoned, assigned to the same assignee as the present application and a Japanese Laid Open (Kokai) No. Sho 53-139428 (Laid Open on Dec. 5, 1978, in Japan).

It is also known in the art to control the levels of the color signals based on the color temperature of the illumination. For this, so called "White Balancing" control, variable gain amplifiers are provided in color signal lines and the gain of each amplifier is controlled so that the ratio of the color signals becomes R:G:B=1:1:1 with respect to a white color object. This minimizes the generation of a Nyquist folding distortion and resulting false signal. This technique is disclosed in, for example, U.S. Pat. No. Re 28,774 (reissued on Apr. 13, 1976, entitled "White Balance Control System", granted to Kubota et al.).

Furthermore, it is known to increase circuit gain in order to increase sensitivity of the pickup apparatus, with some accompanying deterioration in picture quality, when the pickup apparatus is used without sufficient illumination for image pickup. Particularly, many image pickup apparatus for home use (that is, so called "Home Video" Cameras) are equipped with an automatic gain control (AGC) circuit which automatically increases the circuit gain to increase sensitivity when the object scene becomes darkened.

Figure 5:
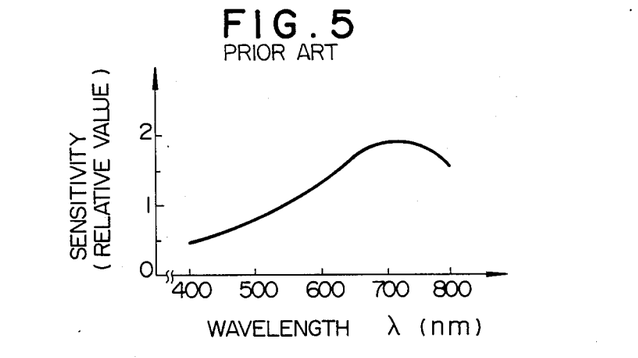
FIG. 5 is a graph showing a spectral sensitivity characteristic of a solid state image pickup element.

Here, as is commonly known, a solid state image pickup element, such as a CCD, tends to lose sensitivity to shorter wave length illumination. For example, the spectral sensitivity characteristic of a CCD image pickup element is lower for shorter wave length illumination and higher for longer wave length illumination, as shown in FIG. 5. Accordingly, the color output produced by the CCD image pickup element, though depending on the color temperature of the object, generally tends to become large for longer wave lengths (i.e., Red) and small for shorter wave lengths (i.e., Blue). Particularly, in case of an object having a low color temperature, the output for the blue color, that is, the color signal B becomes very small in comparison with the output for the red color, that is, the color signal R.

Therefore, in the case of an image pickup apparatus using a solid state image pickup element, it is necessary, at the time of forming the luminance signal (Y) by switching and combining the color signals (R, G and B), to increase the gain of the output signal of the pickup element corresponding to the shorter wave length color filter (B) in order to compensate for the low sensitivity of the solid state image pickup element in that wave length range. Thus, the gain of the color signal for the shorter wave length range (B) is further increased, for example, in order to increase sensitivity in the case of a poorly illuminated or low color temperature object. This increase in signal gain necessarily causes a lowering of the signal to noise ratio (S/N). Thus, when the gain of the color signal (B) become large, the S/N of the luminous signal (Y) lowers greatly and the resulting picture quality deteriorates.

SUMMARY OF THE INVENTION

According to a first aspect of the present invention, there is provided an image pickup apparatus which comprises image pickup means, signal forming means including first gain controllable circuit means, first gain control means, second gain controllable circuit means, and second gain control means. The image pickup means produces plural color signals. The signal forming means combines the color signals to form a luminance signal based on the color signals produced by the image pickup means and the first gain controllable circuit means controls the gain of the luminance signal. The first gain control means controls the gain of the first gain controllable circuit means in the signal forming means. The second gain controllable circuit means controls the gain of at least one of the plural color signals. The second gain control means controls the gain of the second gain controllable circuit means in response to the change in the gain of the first circuit means controlled by the first gain control means.

As is understood from preferred embodiments of the present invention, the signal forming means may further include switching means for switching, one by one, the color signals in order to form the luminance signal. The second gain control means may be arranged to control the gain of the second gain controllable circuit means in accordance with the color temperature of an object scene and with the gain of the first gain controllable circuit means controlled by the first gain control means. The second gain control means may be arranged to cause the second gain controllable circuit means to attenuate one of the color signals corresponding to a wave length for which the image pickup means lacks for sensitivity, when the first gain control means controls the gain of the first gain controllable circuit means at a higher value. The second gain control means can be arranged to cause the second gain controllable circuit means to attenuate the color signal corresponding to a shorter wave length when the first gain control means controls the gain of the first gain controllable circuit means at a higher value. The image pickup means may include a solid state image pickup element such as a CCD image pickup element. The second gain controllable circuit means may include gain controllable or variable gain amplifier means.

As described in connection with the first embodiment of the present invention, the first gain control means may include first and second signal source means and first selection means. The first and second signal source means provide first and second gain control signals to control the gain of the first gain controllable circuit means at a first value and a second value higher than the first value, respectively. The first selection means selects one of the first and second signals for the first gain controllable circuit means. The second gain control means may be arranged to be responsive to the selecting operation of the first selection means to control the gain of the second gain controllable circuit means. The second gain control means may include third and fourth signal source means and second selection means. The third signal source means provides a third gain control signal to control the gain of the second gain controllable circuit means in accordance with the color temperature of the object scene. The fourth signal source means provides a fourth gain control signal to control the gain of the second circuit means at a predetermined value. The second selection means selects one of the third and fourth signals for the second gain controllable circuit means in correspondence to the selection of the first and second signals by the first selection means. The second selection means may be arranged to select the fourth signal when the first selection means selects the second signal. The fourth signal source means may be arranged to provide as the fourth signal, a signal which causes the second gain controllable circuit means to attenuate one of the color signals.

Also, as is embodied in the second embodiment of the present invention, the first gain control means may be arranged to produce a gain control signal to control the gain of the first gain controllable circuit means on the basis of the luminance signal formed by the signal forming means. The second gain control means may be arranged to produce a gain control signal to control the gain of the second gain controllable circuit means on the basis of the color temperature of the object scene and the gain control signal produced by the first gain control means. The second gain control means can be arranged to cause the second gain controllable circuit means to attenuate one of the color signals when the first gain control means controls the gain of the first gain controllable circuit means at a higher value.

According to a second aspect of the present invention, there is provided a color image pickup apparatus which comprises color image pickup means, luminance signal forming means, color balancing means, color signal processing means, and first, second and third control means. The color image pickup means produces a color output including plural color signal components, in response to a received color image of an object. The luminance signal forming means includes first gain controllable circuit means and combines the color signal components to form a luminance signal based on the color output of the image pickup means. The color balancing means includes second gain controllable circuit means and is provided between the image pickup means and the luminance signal forming means. The color signal processing means includes third gain controllable circuit means and processes the color output of the image pickup means into plural color signals. The first control means controls the gain of the first gain controllable circuit means between lower and higher values. The second control means controls the gains of the second and third gain controllable circuit means in response to a predetermined change in the color temperature of the object. The third control means controls the gain of the second gain controllable circuit means in response to a predetermined change in the gain of the first gain controllable circuit means controlled by the first control means.

As is understood from the preferred embodiments of the present invention, the third control means may be arranged to cause the second gain controllable circuit means to attenuate one of the color signal components when the gain of the first gain controllable circuit means is controlled at the higher value by the first control means. The third control means may be further arranged to cause the second gain controllable circuit means to attenuate the color signal component corresponding to a wave length for which the image pickup means lacks for sensitivity. The third control means can be arranged to cause the second gain controllable circuit means to attenuate the color signal component corresponding to a shorter wave length. As to the other arrangement, the same arrangement that is explained in relation to the first aspect can be applied.

Thus, with the features of the first and second aspects of the present invention, it becomes possible to prevent the S/N of the luminance signal from lowering, and accordingly, prevent the picture quality from deteriorating, when the circuit gain is increased.

The above and other aspects, features and advantages of the present invention will become apparent from the following detailed description of the preferred embodiments of the present invention with reference to the drawings.

DETAILED DESCRIPTION OF THE PREFERRED EMBODIMENTS

Figure 1:
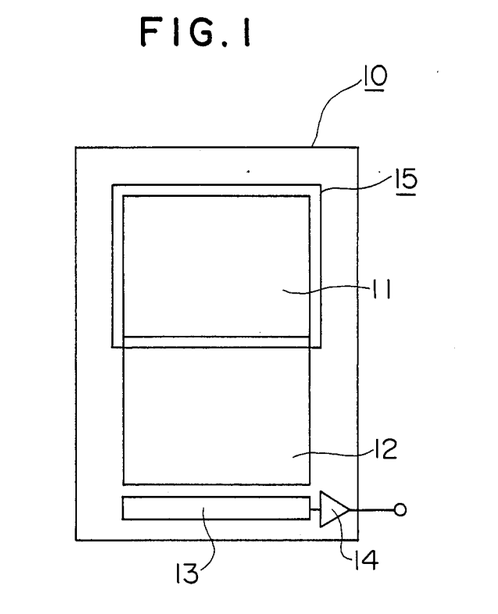
FIG. 1 is a schematic diagram showing an example of a solid state color image pickup element used in one embodiment of the present invention.
Figure 2:
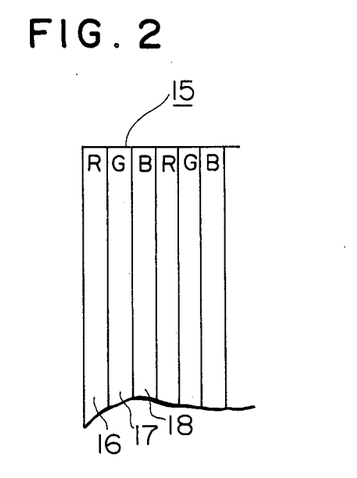
FIG. 2 is a schematic diagram showing a portion of a color stripe filter provided on the image pickup element of FIG. 1.

Referring to FIG. 1, there is shown a frame transfer type color CCD image pickup element (CCD) 10. The CCD 10 comprises an image pickup part 11, a storage part 12 connected to the pickup part 11, a horizontal transfer register 13 connected to the storage part 12, an output amplifier 14 provided at the end of the register 13, and a color separation filter 15 provided on the pickup part 11. Here, as is shown in FIG. 2, the filter 15 is a color stripe filter having a repetition of a red (R) filter part 16, a green (G) filter part 17 and a blue (B) filter part 18. Each of these parts corresponds to one column or one vertical array of pixels in the pickup part 11.

The operation of the CCD 10 having the above described construction will now be explained. When a light image of an object is formed by a lens (not shown) on the image pickup part 11, each pixel in the pickup part 11 produces and stores an electrical charge in correspondence to a received part of the image and thus an electrical charge pattern is stored in the pickup part 11 in correspondence to the color light image. The stored electrical charge pattern is transferred from the pickup part 11 to the storage part 12 and then the stored charges are read out, line by line, through the register 13 from the storage part 12 and are converted into corresponding voltages, pixel by pixel, at the amplifier 14. Thus, a dot sequential color signal composed of the repetition of a red (R) signal, a green (G) signal and a blue (B) signal is output from the amplifier in correspondence to the repetition of the R, G and B filter parts 16, 17 and 18 of the color stripe filter 15.

Figure 3:
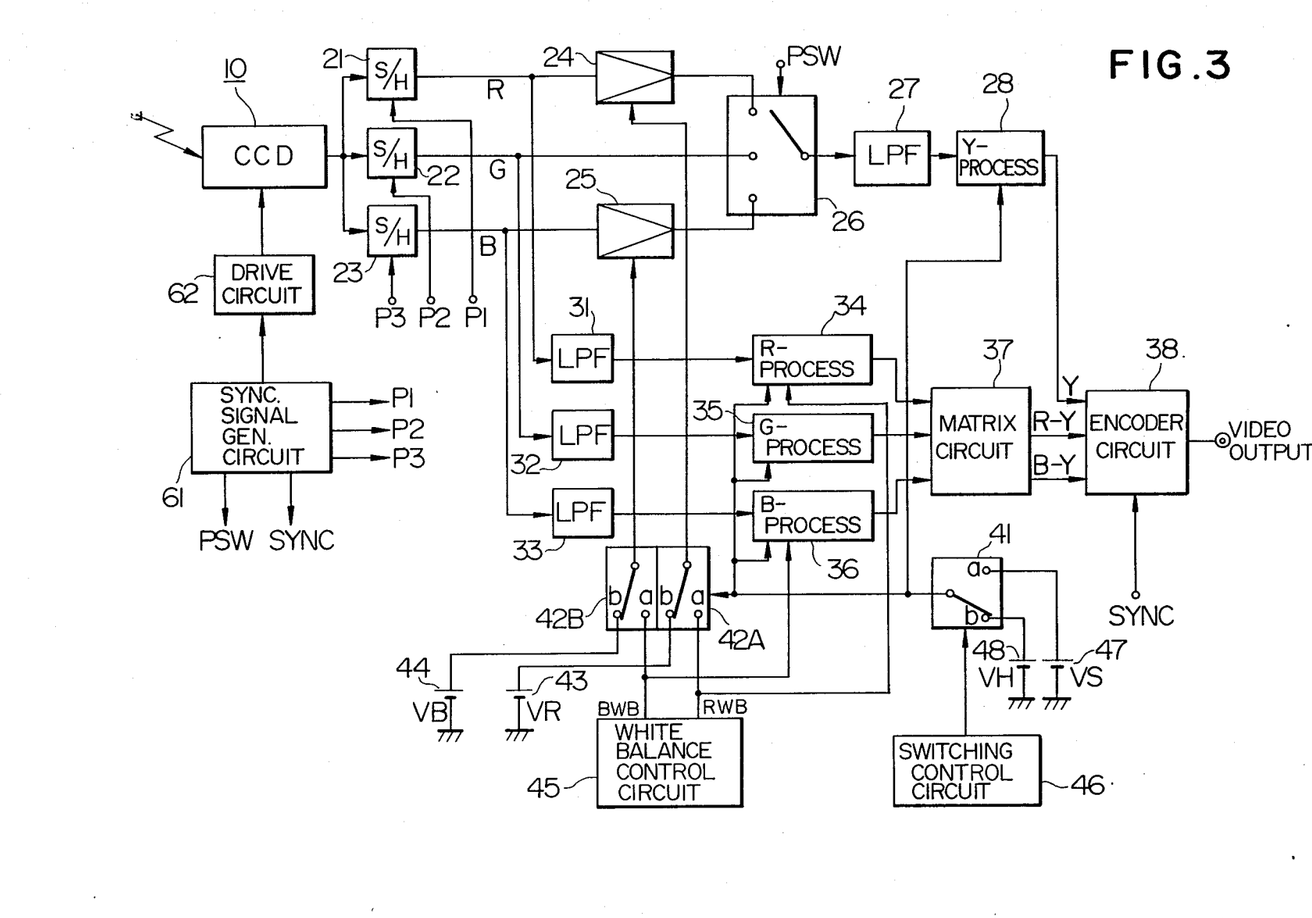
FIG. 3 is a block diagram of an image pickup apparatus constituting one embodiment of the present invention.

Next, referring to FIG. 3, there is shown in block diagram form an embodiment of the present invention in which the CCD 10 explained above is made of use as an image pickup element. Sample and hold circuits 21, 22 and 23 for color separation are connected to receive the output of the CCD 10. Gain controllable (variable gain) amplifiers 24 and 25 for white balancing are respectively connected to receive red (R) and blue (B) signal outputs from the sample and hold circuits 21 and 23. A switching circuit 26 is connected to repeatedly select, one by one, the outputs of the amplifier 24, the sample and hold circuit 22 and the amplifier 25. A low pass filter (LPF) 27 is connected to receive the output of the switch circuit 26. A luminance (Y) signal processing circuit 28 including therein a gain controllable amplifier is connected to receive the output of the LPF 27. The sample and hold circuits 21, 22 and 23, the amplifiers 24 and 25, the switching circuit 26, the LPF 27 and the processing circuit 28 are all of conventional construction.

Low pass filters (LPFs) 31, 32 and 33 are respectively connected to receive the outputs of the sample and hold circuits 21, 22 and 23. Color signal processing circuits 34, 35 and 36 for the R, G and B signals are respectively connected to receive the outputs of the LPFs 31, 32 and 33. Each of the processing circuits 34, 35 and 36 includes therein a gain controllable amplifier. A matrix circuit 37 is connected to receive the outputs of the color signal processing circuits 34, 35 and 36. An encoder circuit 38 is connected to receive the outputs of the Y signal processing circuit 28 and the matrix circuit 37. The low pass filters 31, 32 and 33, the signal processing circuits 34, 35 and 36, the matrix circuit 37 and the encoder circuit 38 are all of well known construction.

Gain control signal sources 47 and 48 are provided to respectively produce a standard gain signal VS and a high gain signal VH. A switching circuit 41 is connected to select, as a gain control signal, one of the signals VS and VH for each of the amplifiers in the processing circuits 28, 34, 35 and 36. A white balance control circuit 45 having a known construction, such as disclosed in the above mentioned U.S. Pat. No. Re. 28,774, is provided to produce a red (R) balance control signal RWB and a blue (B) balance control signal BWB for the white balancing. The outputs RWB and BWB of the white balance control circuit 45 are respectively connected to control the gains of the amplifiers in the R and B signal processing circuits 34 and 36 in accordance with the white balancing. Gain control signal sources 43 and 44, similar to the sources 47 and 48, are provided to produce gain control signals VR and VB to control the gains of the amplifiers 24 and 25 at predetermined values, respectively. A switching circuit 42A is connected to select one of the control signals RWB and VR for the amplifier 24. A switching circuit 42B is connected to select one of the control signals BWB and VB for the amplifier 25. A switching control circuit 46 is connected to control the switching of the switching circuit 41. The switching circuits 42A and 42B are arranged to respond to the output of the switching circuit 41 so that the switching circuits 42A and 42B switch between their respective "a" and "b" positions in correspondence with the switching of the switching circuit 41 between its "a" and "b" positions.

A synchronization signal generation circuit 61 is provided to produce sampling pulses P1, P2 and P3 of three phases for the sample and hold circuits 21, 22 and 23, a switching pulse PSW for the switching circuit 26, synchronization signals SYNC for the encoder circuit 38, and other system clock pulses. A drive circuit 62 is connected to drive the CCD 10 in response to the clock pulses from the generation circuit 61.

The operation of the above described apparatus will now be explained. When a main switch (not shown) is turned on, the synchronization signal generation circuit 61 starts to produce pulse signals and thus the drive circuit 62 starts to drive the CCD 10. As explained above, the CCD 10, when driven, outputs a dot sequential signal and the sample and hold circuits 21, 22 and 23 separate the R, G and B signals from the dot sequential color signal by sampling and holding the signal in response to the three phase sampling pulses P1, P2 and P3 supplied by the generation circuit 61 in synchronism with the driving of the CCD 10, respectively.

Here, in case the switching circuit 41 is switched to its "a" position through the switching control circuit 46, the standard gain signal VS is selected and the gains of the amplifiers in the signal processing circuits 28, 34, 35 and 36 are controlled at a standard value. Also, the switching circuits 42A and 42B are switched to their respective "a" positions, correspondingly, and thus, the gains of the amplifiers 24 and 25 are controlled by the outputs RWB and BWB of the white balance control circuit 45, respectively. As is well known in the art, the white balance control circuit 45 controls, by means of the color balance control signals RWB and BWB, the gains of the amplifiers 24 and 25 so that the ratio of the outputs of the sample and hold circuit 22 and the amplifiers 24 and 25 becomes 1:1:1 with respect to a white color image. The gains of the amplifiers in the color signal processing circuits 34 and 36 are also controlled by the color balance signals RWB and BWB in accordance with the white balancing, respectively.

The switching circuit 26 selects, one by one, the outputs of the circuits 24, 22 and 25 in response to the switching pulse PSW supplied from the generation circuit 61 in synchronism with the three phase sampling pulses P1, P2 and P3. The output of the switching circuit 26 is supplied through the LPF 27 to the Y signal processing circuit 28 and is processed into the Y signal. This Y signal is supplied to the encoder circuit 38.

On the other hand, the outputs of the sample and hold circuits 21, 22 and 23 are respectively supplied through the LPFs 31, 32 and 33 to the color signal processing circuits 34, 35 and 36 and are processed into the R, G and B signals, respectively. The outputs of the processing circuits 34, 35 and 36 are supplied to the matrix circuit 37 and are processed into color difference signals R-Y and B-Y. These color difference signals R-Y and B-Y are supplied to the encoder circuit 38. Thus, the encoder circuit 38 produces a standard TV signal such as an NTSC signal based on the Y signal, the color difference signals R-Y and B-Y, and the synchronization signals supplied from the generation circuit 61.

The above explained operation is performed when the switching circuits 41, 42A and 42B are switched to their respective "a" positions, that is, to the standard gain mode.

On the other hand, when the switching circuit 41 is switched to its "b" position through the switching control circuit 46, the high gain signal VH is selected and the gains of the amplifiers in the signal processing circuits 28, 34, 35 and 36 are controlled at a high value to increase the sensitivity of the image pickup apparatus.

As explained with reference to FIG. 5, the sensitivity of the CCD 10 to shorter wave lengths, i.e., the blue (B) light, is relatively low in this case because this CCD is made of a silicon semiconductor. Accordingly, the gain of the amplifier 25 is usually controlled at a relatively high value by the white balance control circuit 45 due to the low level of the B signal output from the CCD 10. Therefore, if the gain of the amplifier in the Y signal processing circuit 28 is increased in addition to the high gain of the amplifier 25, the gain of the B signal becomes considerably high and this lowers the S/N of the Y signal output from the processing circuit 28.

To avoid the above mentioned drawbacks, in this embodiment, when the switching circuit 41 is switched to its "b" position through the switching control circuit 46, the switching circuits 42A and 42B are controlled by the output of the switching circuit 41 to be switched to their respective "b" positions, correspondingly. Thus, the gain control signals VR and VB are respectively selected for the amplifiers 24 and 25 and the gains of the amplifiers 24 and 25 are controlled accordingly. Here, the values of the gain control signals VR and VB are so selected in accordance with the spectral sensitivity characteristic of the CCD 10 that the S/N of the Y signal output from the Y signal processing circuit 28 becomes high or maximum. For example, in case of the CCD having a RGB color stripe filter, the values of the control signals VR and VB are so selected that the signal level of the B signal output from the amplifier 25 becomes low while the signal level of the R signal output from the amplifier 24 becomes high, or at least the signal level of the B signal becomes low. Thus, it is possible to avoid lowering of the S/N of the Y signal while in the high gain mode.

In this embodiment, the switching control circuit 46 may be manually operable or it may be operated automatically in response to, for example, the scene brightness. Moreover, the switching circuits 42A and 42B may be arranged to be directly controlled by the switching control circuit 46 in correspondence to the switching of the switching circuit 41.

Another embodiment will now be explained with reference to FIG. 4. As there shown, a smoothing circuit 51 is connected to receive the output of the Y signal processing circuit 28. A differential amplifier 52 is connected to produce a differential signal between the output of the smoothing circuit 51 and a predetermined reference voltage Vref supplied by a reference voltage source 53. The output of the differential amplifier 52 is connected to control the gains of the amplifiers in the signal processing circuits 28, 34, 35 and 36. A level converter 54 is connected to receive the output of the differential amplifier and to produce red and blue gain control signals RG and BG in response thereto. An addition circuit 55 is connected to receive and add the R gain control signal RG output by the level converter 54 and the R balance control signal RWB output from the white balance control circuit 45. An addition circuit 56 is connected to receive and add the B gain control signal BG output from the level converter 54 and the B balance signal BWB output from the white balance control circuit 45. The outputs of the addition circuits 55 and 56 are respectively connected to control the gains of the amplifiers 24 and 25.

Figure 4:
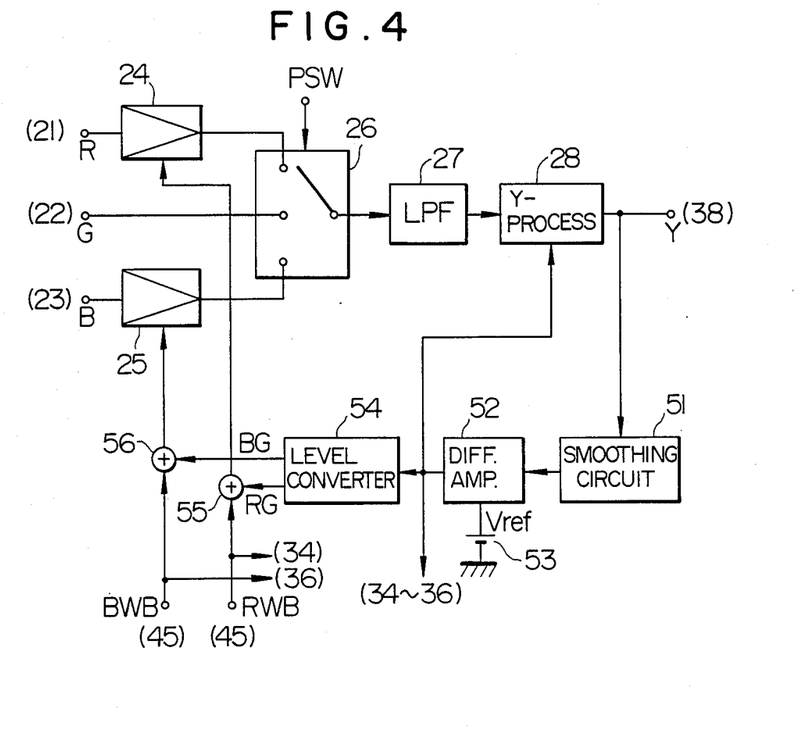
FIG. 4 is a block diagram of an image pickup apparatus constituting another embodiment of the present invention and FIG. 4a is a block diagram of the circuitry for detecting the brightness of the object.

Other than the above, the arrangement of FIG. 4 is similar to that shown in FIG. 1.

The operation of the embodiment of FIG. 4 will now be explained. When the output of the differential amplifier 52 corresponds to a standard gain, the level converter 54 controls its output signals RG and BG so that the outputs of the addition circuits 55 and 56 become equal to the balance control signals RWB and BWB, respectively. Thus, the amplifiers 24 and 25 are respectively controlled by only the balance control signals RWB and BWB output by the white balance control circuit 45 while the gains of the amplifiers in the processing circuits 28, 34, 35 and 36 are controlled by the output of the differential amplifier 52.

On the other hand, when the differential amplifier 52 controls the gains of the amplifiers in the processing circuits 28, 34, 35 and 36 at a high value, the level converter 54 controls its output signals RG and BG so that the output of the addition circuit 56 decreases the gain of the amplifier 25 while the output of the addition circuit 55 increases the gain of the amplifier 24, or at least the output of the addition circuit 56 decreases the gain of the amplifier 25. Thus, when the gains of the amplifiers in the processing circuits 28, 34, 35 and 36 are increased, at least the signal level of the B signal output from the amplifier 25 is decreased so that the S/N of the Y signal output from the Y signal processing circuit 28 is now lowered. Therefore, it is possible to avoid lowering of the S/N of the Y signal while operating in the high gain mode.

As possible modifications, only the amplifier 25 may be arranged to be controlled in accordance with the increase in the gains of the amplifiers in the processing circuits 28, 34, 35 and 36. That is, the switching circuit 42A and the signal source 43 may be deleted from the arrangement shown in FIG. 3 and the output RWB of the white balance control circuit 45 may be directly connected to the amplifier 24. Also, the addition circuit 55 may be deleted from the arrangement shown in FIG. 4 and the output RWB of the white balance control circuit 45 may be directly connected to the amplifier.

Figure 4A:
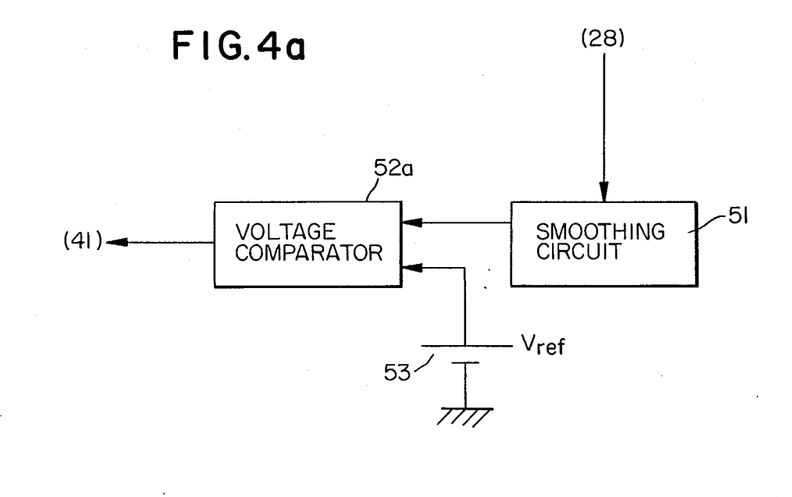

Moreover, as shown in FIG. 4a, as the switching control circuit 46, the combination of the circuits 51, 52 and 53 can be utilized, provided that the differential amplifier 52 is replaced with a voltage comparator 52a.

Furthermore, as the image pickup element, it is possible to utilize one having multiple output channels such as disclosed in U.S. Pat. No. 4,513,313 (Kinoshita et al.) of the same assignee as the present application.

As can be readily appreciated from the foregoing description, according to the present invention, it is possible to prevent the S/N of the luminance signal from lowering, and accordingly to prevent the picture quality from deteriorating, when the circuit gain is increased.

The present invention need not necessarily be restricted to the above described embodiments but many modifications can be made within the scope of the invention claimed in appended claims.

I claim:

1. An image pickup apparatus comprising:

(A) image pickup means for producing plural color signals representing different wavelengths of light corresponding, respectively, to different colors;
(B) signal forming means for combining said color signals to form a luminance signal based on the color signals, said signal forming means including first controllable-gain circuit means for changing the level of said luminance signal, said signal forming means further including switching means for sequentially selecting each of the plural color signals in order to form the luminance signal;
(C) first gain control means for changing the gain of said first controllable-gain circuit means in said signal forming means;
(D) second controllable-gain circuit means for changing the level of one of said plural color signals; and
(E) second gain control means for changing the gain of said second controllable-gain circuit means in response to a change in the gain of said first controllable-gain circuit means in said signal forming means controlled by said first gain control means.

2. An image pickup apparatus comprising:
(A) image pickup means for producing plural color signals representing different wavelengths of light corresponding, respectively, to different colors;
(B) signal forming means for combining said color signals to form a luminance signal based on the color signals, said signal forming means including first controllable-gain circuit means for changing the level of said luminance signal, said first controllable-gain circuit means being constructed and arranged to change the level of said luminance signal between values that are higher and lower with respect to each other;
(C) first gain control means for changing the gain of said first controllable-gain circuit means in said signal forming means;
(D) second controllable-gain circuit means for changing the level of one of said plural color signals; and
(E) second gain control means for changing the gain of said second controllable-gain circuit means in response to a change in the gain of said first controllable-gain circuit means in said signal forming means controlled by said first gain control means, said second gain control means being arranged to cause said second controllable-gain circuit means to attenuate one of the color signals corresponding to wavelengths for which said image pickup means has a reduced sensitivity when said first gain control means changes the gain of said first controllable-gain circuit means to a higher value.

3. Apparatus according to claim 2, wherein said image pickup means includes a solid-state image pickup element;
and wherein said second gain control means is arranged to cause said second controllable-gain circuit means to attenuate one of the color signals corresponding to wavelengths which are shorter than wavelengths to which the other color signals correspond when said first gain control means changes the gain of said first controllable-gain circuit means to the higher value.

4. An image pickup apparatus comprising:
(A) image pickup means for producing plural color signals representing different wavelengths of light corresponding, respectively, to different colors;
(B) signal forming means for combining said color signals to form a luminance signal based on the color signals, said signal forming means including first controllable-gain circuit means for changing the level of said luminance signal;
(C) first gain control means for changing the gain of said first controllable-gain circuit means in said signal forming means;
(D) second controllable-gain circuit means for changing the level of one of said plural color signals; and
(E) second gain control means for changing the gain of said second controllable-gain circuit means in response to a change in the gain of said first controllable-gain circuit means in said signal forming means controlled by said first gain control means, said second gain control means being arranged to change the gain of said second controllable-gain circuit means in accordance with the color temperature of an object scene and with the gain of said first controllable-gain circuit means controlled by said first gain control means.

5. Apparatus according to claim 4, wherein said first gain control means includes:
first and second signal source means for providing first and second gain control signals to control the gain of said first controllable-gain circuit means at a first value and at a second value higher than the first value, respectively; and
first selection means for selecting one of the first and second gain control signals for said first controllable-gain circuit means;
said second gain control means being responsive to the selecting operation of said first selection means to control the gain of said second controllable-gain circuit means.

6. Apparatus according to claim 5, wherein said second gain control means includes:
third signal source means for providing a third gain control signal to control the gain of said second controllable-gain circuit means in accordance with the color temperature of the object scene;
fourth signal source means for providing a fourth gain control signal to control the gain of said second controllable-gain circuit means at a predetermined value; and
second selection means for selecting one of the third and fourth gain control signals for said second circuit means in accordance with the selection of one of the first and second gain control signals by said first selection means.

7. Apparatus according to claim 6, wherein said second selection means is arranged to select the fourth gain control signal when said first selection means selects the second gain control signal.

8. Apparatus according to claim 7, wherein said fourth signal source means is arranged to provide, as the fourth gain control signal, a signal which causes said second controllable-gain circuit means to attenuate one of the color signals.

9. Apparatus according to claim 8, wherein said fourth signal source means is arranged to provide, as the fourth gain control signal, a signal which causes said second controllable-gain circuit means to attenuate one of the color signals corresponding to wavelengths for which said image pickup means has a reduced sensitivity.

10. Apparatus according to claim 8, wherein said fourth signal source means is arranged to provide, as the fourth gain control signal, a signal which causes said second controllable-gain circuit means to attenuate one of the color signals corresponding to wavelengths which are shorter than wavelengths to which the other color signals correspond.

11. Apparatus according to claim 4, wherein said first gain control means is arranged to produce a gain control signal to control the gain of said first controllable-gain circuit means on the basis of the luminance signal formed by said signal forming means.

12. Apparatus according to claim 11, wherein said second gain control means is arranged to produce a gain control signal to control the gain of said second controllable-gain circuit means in accordance with the color temperature of the object scene and the gain control signal produced by said first gain control means.

13. Apparatus according to claim 12, wherein said first controllable-gain circuit means changes the level of said luminance signal between values that are higher and lower with respect to each other, and wherein said second gain control means is arranged to cause said second controllable-gain circuit means to attenuate one of the color signals corresponding to wavelengths for which said image pickup means has a reduced sensitivity when said first gain control means changes the gain of said first controllable-gain circuit means to said higher value.

14. Apparatus according to claim 12, wherein said first controllable-gain circuit means changes the level of said luminance signal between values that are higher and lower with respect to each other, and wherein said second gain control means is arranged to cause said second controllable-gain circuit means to attenuate one of the color signals corresponding to wavelengths which are shorter than wavelengths to which the other color signals correspond when said first gain control means changes the gain of said first controllable-gain circuit means to said higher value.

15. A color image pickup apparatus comprising:
(A) a solid-state color image pickup element for producing plural color signals representing different wavelengths of light corresponding, respectively, to different colors;
(B) luminance signal forming means for combining said color signals to form a luminance signal by sequentially selecting each of the plural color signals, said signal forming means including a controllable-gain signal processing circuit for controlling the level of said luminance signal;
(C) first gain control means for changing the gain of said signal processing circuit in said signal forming means between higher and lower values;
(D) controllable-gain amplifier means to control the level of one of said plural different color signals; and
(E) second gain control means for changing the gain of said amplifier means in accordance with the color temperature of an object scene and with the gain of said signal processing circuit in said signal forming means controlled by said first gain control means.

16. Apparatus according to claim 15, wherein said second gain control means is arranged to cause said amplifier means to attenuate one of the color signals corresponding to wavelengths for which said pickup element has a reduced sensitivity when said first gain control means changes the gain of said signal processing circuit to said higher value.

17. Apparatus according to claim 16, wherein said first gain control means includes:

first and second signal sources for providing first and second gain control signals to control the gain of said signal processing circuit at a first value and at a second value higher than the first value, respectively; and
a first switch circuit for selecting one of the first and second gain control signals for said signal processing circuit;
said second gain control means being responsive to the switching operation of said first switch circuit to control the gain of said amplifier means.

18. Apparatus according to claim 17, wherein said second gain control means includes:
a third signal source for providing a third gain control signal to control the gain of said amplifier means in accordance with the color temperature of the object scene;
a fourth signal source for providing a fourth gain control signal to cause said amplifier means to attenuate the one color signal; and
a second switch circuit for selecting one of the third and fourth gain control signals in accordance with the selection of one of the first and second gain control signals by said first switch circuit, said second switch circuit being arranged to select the fourth gain control signal when said first switch circuit selects the second gain control signal.

19. Apparatus according to claim 16, wherein said first gain control means is arranged to produce a gain control signal to control the gain of said signal processing circuit on the basis of the luminance signal formed by said signal forming means.

20. Apparatus according to claim 19, wherein said second gain control means is arranged to produce a gain control signal to control the gain of said amplifier means in accordance with the color temperature of the object scene and the gain control signal produced by said first gain control means.

21. Apparatus according to claim 15, wherein said second gain control means is arranged to cause said amplifier means to attenuate one of the color signals corresponding to wavelengths which are shorter than wavelengths to which the other color signals correspond when said first gain control means changes the gain of said signal processing circuit to said higher value.

22. A color image pickup apparatus comprising:
(A) color image pickup means for producing a color output signal including plural color signal components representing different wavelengths of light corresponding, respectively, to different colors in response to a received color image of an object;
(B) luminance signal forming means for combining said color signal components to form a luminance signal, said signal forming means including first controllable-gain circuit means for controlling the level of said luminance signal;
(C) color balancing means provided between said image pickup means and said signal forming means, said color balancing means including second controllable-gain circuit means;
(D) color signal processing means for processing the color output signal of said image pickup means into plural color signals, said signal processing means including third controllable-gain circuit means;
(E) first control means for changing the gain of said first controlled-gain circuit means between lower and higher values;

(F) second control means for controlling the gains of said second and third controllable-gain circuit means in accordance with the color temperature of said object; and (G) third control means for controlling the gain of said second controllable-gain circuit means in response to a predetermined change in the gain of said first controllable-gain circuit means controlled by said first control means.

23. Apparatus according to claim 22, wherein said third control means is arranged to cause said second controllable-gain circuit means to attenuate one of the color signal components when the gain of said first controllable-gain circuit means is changed to the higher value by said first control means.

24. Apparatus according to claim 23, wherein said third control means is arranged to cause said second controllable-gain circuit means to attenuate one of the color signal components corresponding to wavelengths for which said image pickup means has a reduced sensitivity.

25. Apparatus according to claim 23, wherein said third control means is arranged to cause said second controllable-gain circuit means to attenuate one of the color signal components corresponding to wavelengths which are shorter than wavelengths to which the other color signal components correspond.

26. Apparatus according to claim 22, wherein said third control means is arranged to cause said second controllable-gain circuit means to attenuate one of the color signal components in response to an increase in the of said first gain controllable-gain circuit means.

27. A color image pickup apparatus comprising:
(A) a color image pickup means for producing plural color signals corresponding to different colors in response to a received color image of an object;

(B) luminance signal forming means for selecting said color signals in a predetermined order to form a luminance signal;

(C) first controllable-gain circuit means for changing the level of the luminance signal;

(D) color balancing means provided between said image pickup means and said luminance signal forming means for varying the color balance of said plural color signals; and (E) control means for controlling said color balancing means to vary the color balance of said plural color signals by causing one of the color signals corresponding to a blue color to be attenuated when the gain of said first controllable-gain circuit means exceeds a predetermined level.

28. Apparatus according to claim 27, wherein said color image pickup means includes a single image pickup device having a color separation filter in front thereof.

29. Apparatus according to claim 27, wherein said luminance signal forming means includes switching means for sequentially selecting each of the plural color signals in order to form the luminance signal.

30. Apparatus according to claim 27, wherein said color balancing means includes second controllable-gain circuit means for variably controlling the level of at least one of said plural color signals.

31. Apparatus according to claim 27, wherein said control means includes detecting means for detecting the brightness of said object.

32. Apparatus according to claim 27, wherein said control means includes means for controlling said color balancing means to vary the color balance of said plural color signals in accordance with the color temperature and brightness of the object.

* * * * *

UNITED STATES PATENT AND TRADEMARK OFFICE
CERTIFICATE OF CORRECTION

PATENT NO. : 4,860,092
DATED : August 22, 1989
INVENTOR(S) : Teruo Hieda

It is certified that error appears in the above-identified patent and that said Letters Patent is hereby corrected as shown below:

COLUMN 2:

Line 12, "increased, for" should read --increased in case the overall circuit gain is increased, for--

COLUMN 8:

Line 34, "now" should read --not--.

COLUMN 12:

Line 67, "first controlled-gain circuit means" should read --first controllable-gain circuit means--.

COLUMN 13:

Line 32, "the of said first gain" should read --the gain of said first--.

Signed and Sealed this

Sixteenth Day of October, 1990

Attest:

HARRY F. MANBECK, JR.

*Attesting Officer*       *Commissioner of Patents and Trademarks*